May 26, 1931. L. O. THOMPSON 1,807,579
SEAT POSITIONING DEVICE
Filed Dec. 15, 1927 7 Sheets-Sheet 1

Fig.1

Inventor
Lee Otis Thompson
Thomas Bilyeu
Attorney

May 26, 1931.　　　L. O. THOMPSON　　　1,807,579
SEAT POSITIONING DEVICE
Filed Dec. 15, 1927　　　7 Sheets-Sheet 3

Fig. 3

Inventor
Lee Otis Thompson
By Thomas Bilyeu
Attorney

Patented May 26, 1931

1,807,579

UNITED STATES PATENT OFFICE

LEE OTIS THOMPSON, OF VANCOUVER, WASHINGTON

SEAT POSITIONING DEVICE

Application filed December 15, 1927. Serial No. 240,274.

My invention relates to my United States patent application, Serial Number 149,748 filed November 20, 1926, upon a seat positioning device, which said application is now pending in the United States Patent Office.

My invention consists primarily of a group of seat sections, each group preferably comprising two rows or two partial rows of seats with seats in each row; each seat adapted to movement in a horizontal plane in either direction, in either row with selective means for positioning any desired seat within either row of the group and positioning the same at the aisle; the manipulation being accomplished from a central station disposed at the aisle or from a position at the seat; power means being provided for the manipulation and movement of the seats.

The primary object of my present invention is to provide means whereby the theatre patron may temporarily occupy an aisle seat on entering the theatre and may also leave the seat from an aisle position.

A further object of my new and improved device consists in the movement of each group of seats in a horizontal direction, in either direction, in each row and from one row to the other with a full row of seats in each row.

Still further objects of my invention, consist in providing power means for manipulating the seats by means that are quiet in their operation, economical of construction, simple in operation, that may be manipulated by inexperienced occupants and that is practically free from harmful hazards to the patrons of the theatre and the occupants of the seats.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings.

Like reference characters refer to like parts throughout the several views.

Figure 3:
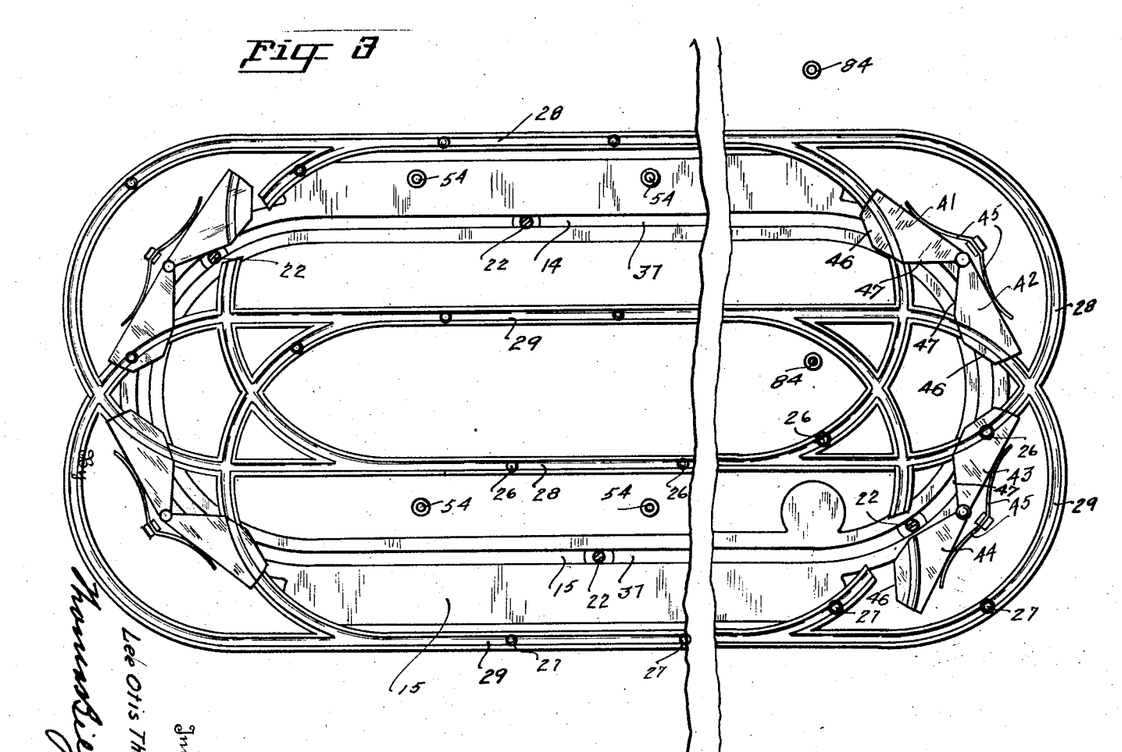
Fig. 3 is a fragmentary, top plan view of the main casting lay out and the guideways disposed therein for the manipulation of the seat sections of the seats, and the series of seats comprising each unit, the same being taken on line 6—6 of Fig. 2, looking in the direction indicated.

In my new and improved device, I form a series of guideways as illustrated in Fig. 3, through the use of which the seats to be moved and manipulated are caused to follow through prescribed pathways.

Figures 2, 12:
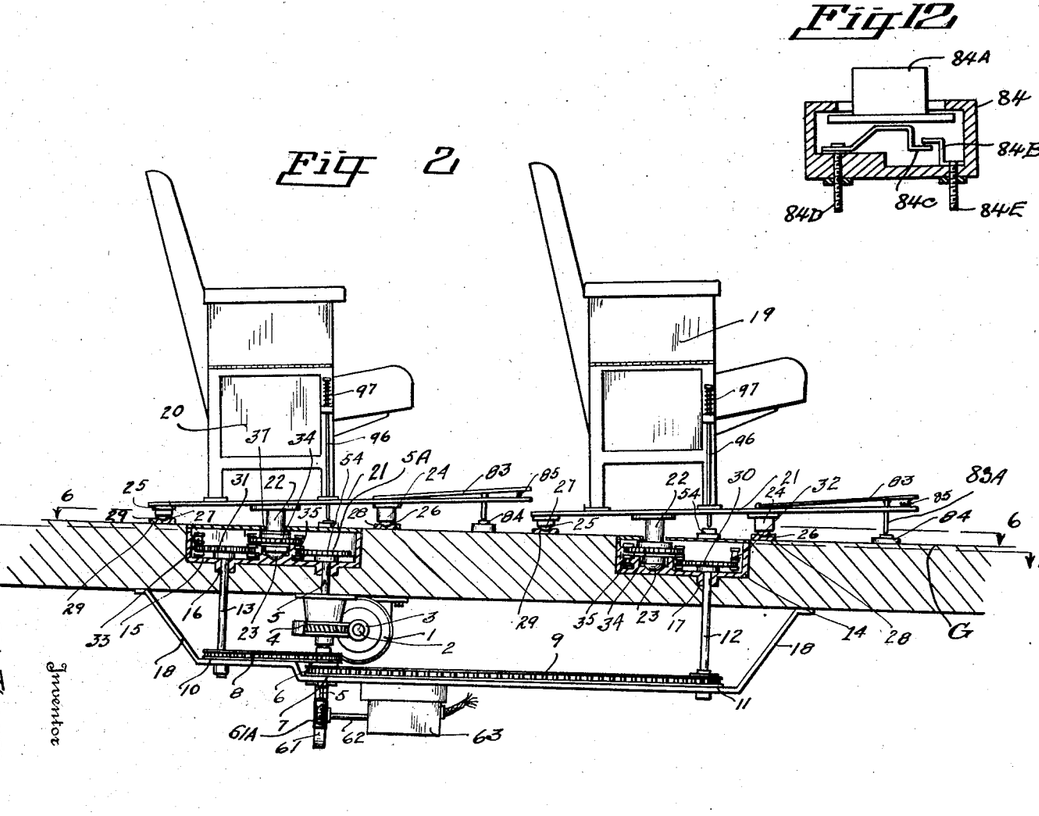
Fig. 2 is an end, sectional view, taken on line 2—2 of Fig. 1 looking in the direction indicated.
Fig. 12 is a detail section view of an electric switch forming part of the electric control mechanism.

Referring to Fig. 2: 1 is an electric prime mover having a shaft 2 extending therefrom upon which a speed reduction element, as a worm 3, is disposed. The worm 3 coacts with the worm wheel 4 which is disposed upon the vertical shaft 5. The vertical shaft 5 is the driving or power shaft. Disposed upon the driving shaft 5 are two driving elements 6 and 7 about which silent driving chains 8 and 9 pass. These driving chains are preferably made of a flexible relatively high speed type because of the accuracy of transmission required and because of the character of work for which the same is intended. These driving chains respectively pass about sprockets 10 and 11 which are disposed upon the vertical shafts 12 and 13. The shafts 12 and 13 are disposed within bearings passing through channel ways, or raceways 14 and 15, which are provided with hubs 16 and 17 disposed upon their bases through which the shafts pass. The lower ends of the shafts 12 and 13 pass through the base 18, thus stabilizing the same. Bearings are disposed adjacent either end of the shafts 12 and 13 thus maintaining the same in position and alignment. The channels or raceways 14 and 15, each have upturned side walls the object of which is to form a raceway through which driving chains are made to operate for the furnishing of the motive power for the moving of the seats within their predetermined pathways.

Referring to Fig. 2: I have shown seats 19 and 20 occupying adjacent rows in a series, and as stated in the preamble of this application; it is the purpose of my invention to move seats of the series in either direction in either row and from one row to the other. This is accomplished primarily by the fact that the electric prime mover 1 is adapted to be rotated in either direction. The seats are mounted upon a platform 21. The platform 21 has a spindle 22 downwardly extending from the base and terminating on its lower end in a ball bearing 23. The ball bearing 23 rests upon the base, and is adapted to travel within a pathway adapted to receive the ball and to guide the same therealong. Downwardly extending from the platform 21 are supports 24 and 25, each having a depression in the lower end thereof having seated therein ball bearings 26 and 27 respectively adapted to ride within raceway or trackways 28 and 29.

Figure 4:
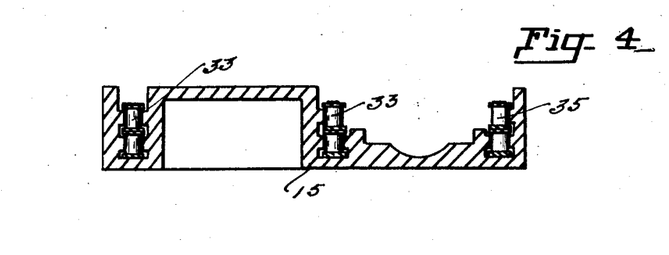
Fig. 4 is a fragmentary, sectional, end elevation of a part of the guideways through which the seat sections are operated.
Figure 5:
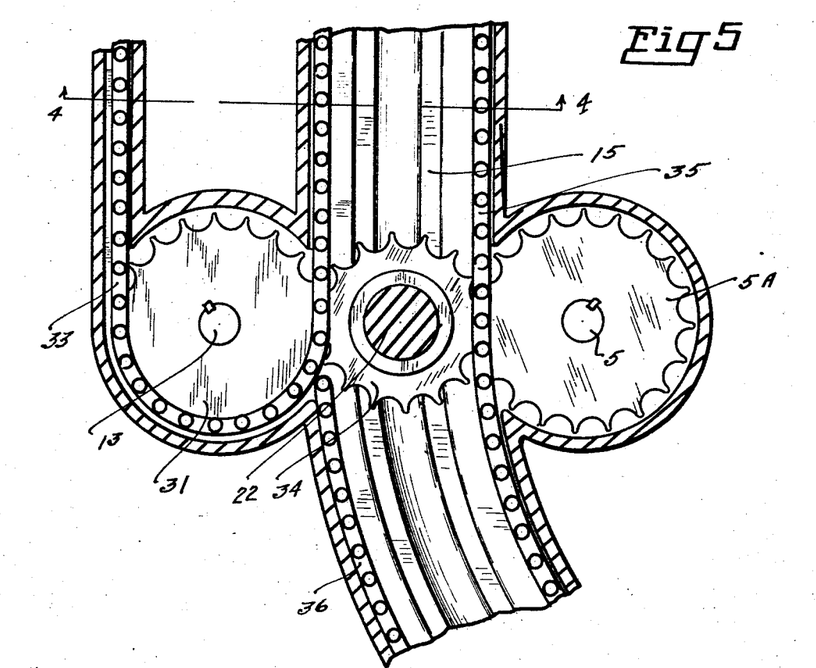
Fig. 5 is a fragmentary, top plan view, of one of the guideways for the manipulating and driving chain and illustrating the driving elements, as sprockets, disposed within suitable bearings at either side thereof, for driving the chain, the same being taken on line 5—5 of Fig. 6, looking in the direction indicated.
Figure 6:
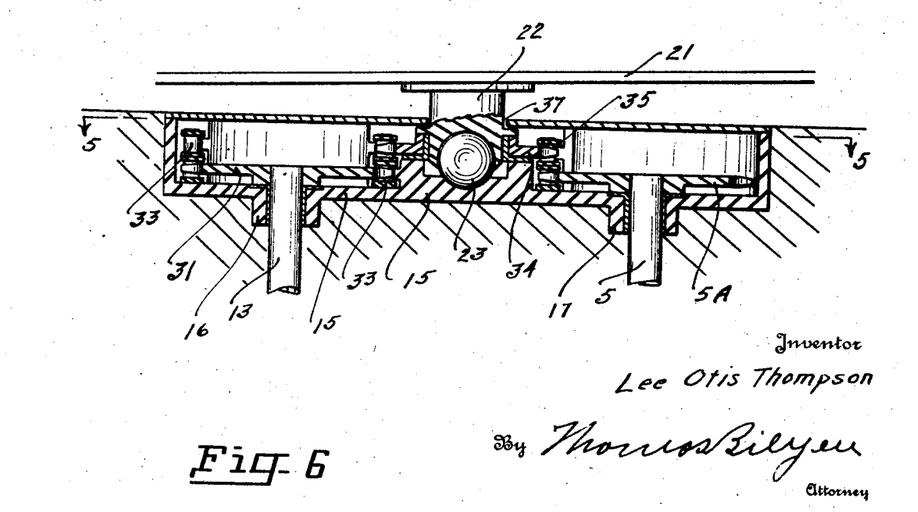
Fig. 6 is a fragmentary, sectional, elevation of the assembled device, the same being made with the seat detached.
Figure 7:
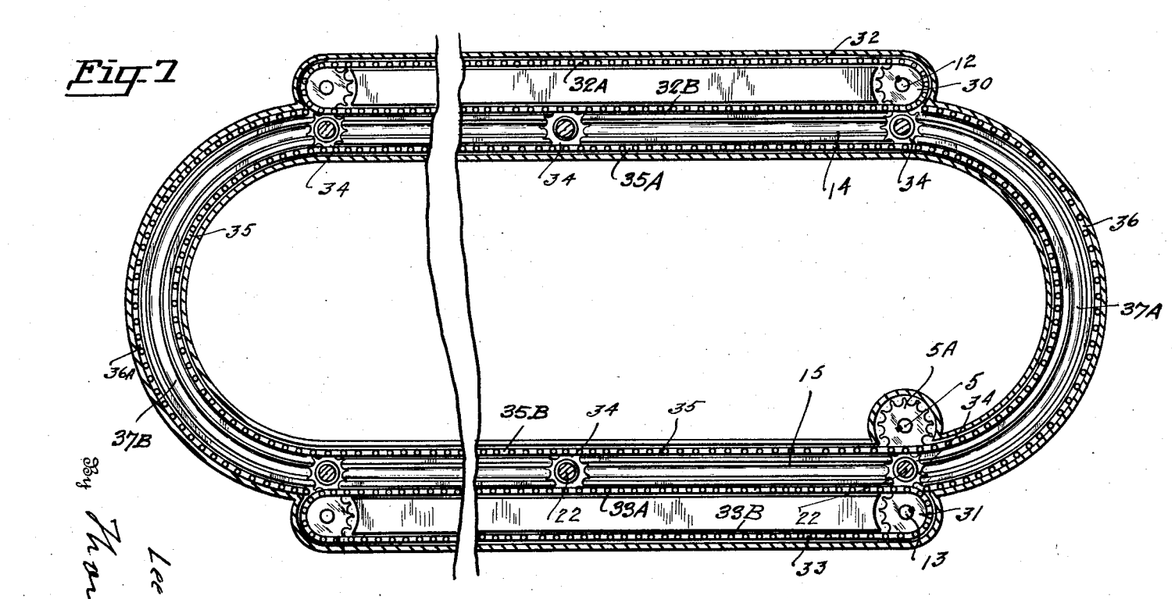
Fig. 7 is a fragmentary, top, plan view, taken on line 7—7 of Fig. 2, looking in the direction indicated.
Figure 8:
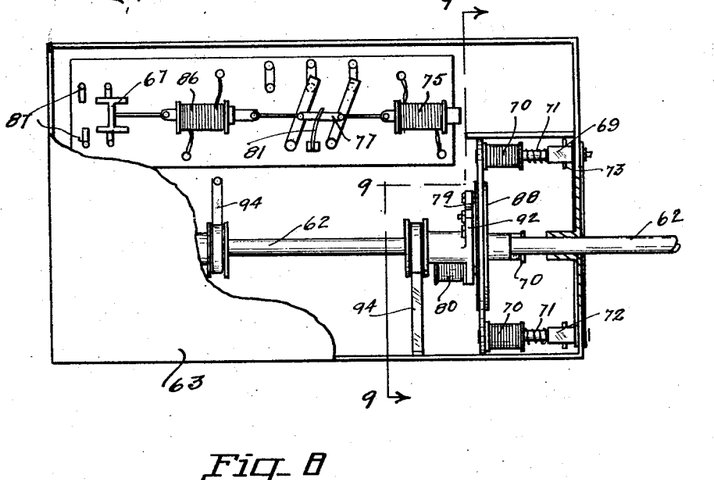
Fig. 8 is a diagrammatical lay-out of the electric controls.

Mounted upon the driving shaft 5, is sprocket 5A, as illustrated in Fig. 2, and mounted upon the driving shaft 12 and 13 respectively also illustrated in Fig. 2, are sprockets 30 and 31, which two last sprockets respectively have chains 32 and 33 coacting therewith, which are adapted to being driven thereby. Each spindle 22 is provided with a sprocket 34 free to revolve thereon. Attention is here called to Fig. 7, also to Figs. 4, 5 and 6. In Fig. 7, the guideways 14 and 15 are seen to be opposite straight sides of an endless guideway 37 A cross section of this guideway is shown in Fig. 4. The guideway proper is located in the depression between the chains 33 and 35. Running along and around the inner wall of the guideway 37 is an endless chain 35, which meshes with and is driven by the sprocket 5A. Within the curved ends 37A and 37B of the guideway 37 are stationary chains or racks 36 and 36A. Parallel to the side 14 of the guideway runs the endless chain 32 meshing with and driven by the sprocket 31, and parallel with the side 15 runs the endless chain 33 meshing with and driven by sprocket 31. The sprockets 30 and 31, as heretofore set forth are driven from shaft 5 mounting sprocket 5A, and revolve in the same direction as does sprocket 5A.

Viewing Fig. 7, let it be assumed that the sprockets 5A, 30 and 31 are revolving clockwise, the upperside 35A of the chain 35 will move toward the right, and the lower side 35B, toward the left. The upperside 32A of chain 32 will move to the right, and the lower side 32B, to the left and opposite to the movement of the upperside 35A of chain 35. Likewise the upperside 33A of chain 33 will move to the right and opposite the direction of the lower side 35B of chain 35, which as before stated moves to the left, and the lower side 33B of chain 33 will move to the left. In the description to follow of the cooperation of chains 32 and 35, it may be considered that this description applies equally as well to chains 33 and 35.

As before stated sprockets 34 are mounted to freely revolve upon spindles 22, each of which project downwardly beneath each platform 21, therefore, the movement of a sprocket 34 about the guideway 37 will cause a corresponding movement of the spindle, platform, and a chair carried by the platform.

The chain 35 carries each sprocket about the guideway 37 in the direction of its rotation, which in this case is clockwise. If the sprocket 34 is in one of the straight stretches of guideway 37, for example 14, it will mesh with both chains 35 and 32. The chain 35 is moving to the right, and the lower side 32B of chain 32 is moving to the left. If these two chains move at the same rate of speed, the sprocket 34 will merely revolve and will not travel along the guideway. If chain 32 moves at lesser speed than chain 35, the sprocket will revolve, and in addition thereto will travel along the guideway in the direction that chain 35 moves, but at a speed considerably less than the speed of that chain. However if chain 32 were capable of remaining stationary while chain 35 moves, the sprocket 34 would travel faster than before, but still at considerably less speed than chain 35. The sprockets 34 when traveling in the curved portions 37A and 37B mesh with the racks 36 and 36A.

The movement of the chains 32 and 33 is considerably slower than the movement of chain 35, so that the sprockets 34 when traveling in the curved portions 37A and 37B mesh with the racks 36 and 36A.

The movement of the chains 32 and 33 is considerably slower than the movement of chain 35, so that the sprockets 34 will move in the curved sections 37A and 37B at a considerably greater rate of speed than in the straight sections 14 and 15. An explanation of the purpose or reason for increasing the rate of speed of travel of the sprockets as they move around the curved portions of the guideway will now be given.

Figure 1:
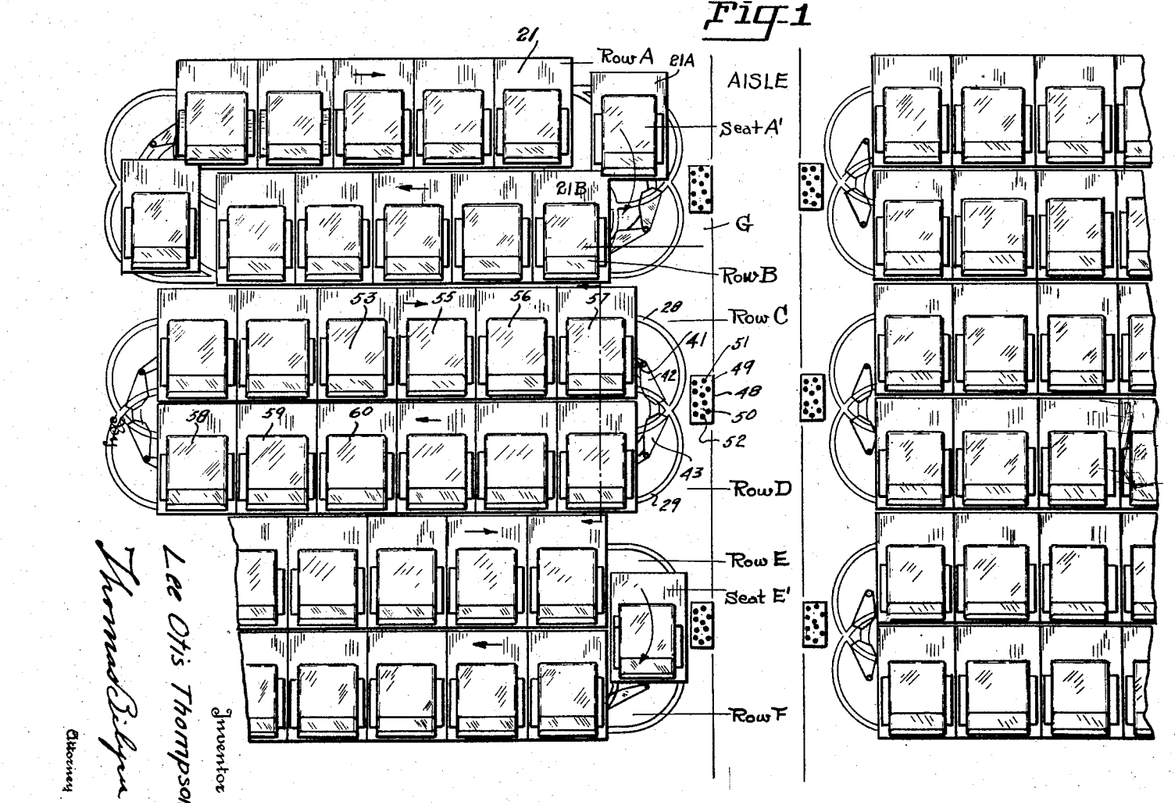
Fig. 1 is a top, plan view, of two rows of seat sections comprising one group of seats to be operated as a series.

Fig. 1, shows the seat rows installed in, for instance a theatre. The seat rows A and B comprise a cooperating unit, as do rows C and D, and rows E and F. These rows are positioned upon an inclined floor G, so that the guideways are positioned transversely at an inclination to the horizontal, thereby elevating the rear row of seats somewhat above the front row. This is particularly shown in Fig. 2. This figure shows that there is a vertical clearance between the rear end of front platform 21 and the front end of rear platform 21, this clearance will hereafter be referred to as the "vertical clearance". The seats in rows A and B are each provided with a spindle 22 moving guideway 37 (concealed beneath platforms 21), assuming a clockwise movement of chain 37 (concealed beneath platforms 21), assuming a clockwise movement of chain 37 (likewise concealed) row A moves to the right as indicated by the arrow, and row B moves to the left as indicated by an arrow. Seat A' of row A has arrived at the curved section 37A of the guideway and its speed of travel is here accelerated, and it here departs from its straight course heretofore taken and describes an arcuate course and moves toward row B. The course of seat A' is indicated by the arcuate arrow covering it. The seat B' in row B perform a like movement and travels toward row A. The vertical clearance above referred to allows platform 21A to move over and past platform 21B. In rows E and F, the movement of a seat from one row to the other is shown half completed. The seat E' is moving as shown by the arcuate arrow covering it. It is necessary that the movement of a seat from one row to another be accelerated in order to provide a clearance between it and the adjacent seat of the row it is leaving. There are four balls which support each platform 21, of which two each 26 and 27 move within endless trackways 38 and 39. In order to provide for the continuous passage within the slot or guideways 37 and to permit of the ball bearings of the seat passing continuously around the endless trackways 38 and 39 and to further provide for the continuous and uninterrupted movement of the seats between associated seat rows, the trackways 38 and 39, within which the spindles supporting the seat platforms 21 travel, are provided with devices whereby said spindles may cross and recross guideway 37. These devices consist of segments 41, 42, 43, and 44, as illustrated in Fig. 3, which are normally disposed within the line of travel of the spindle adapted to being actuated within the guideway 37. Each of these segments are maintained in normal position, through the action of a spring 45. Each of the segments have sloping side walls 46 and 47, against which the spindles engage thereby moving the segments out of normal position for a sufficient time to permit of the spindle to pass thereby. Immediately after the spindle has passed the spring 45 returns the segment to normal position. To prevent a too abrupt return of the segment into position, after the spindle has passed the oppositely disposed sloping surface of each segment engages the spindle, thus permitting it to silently and quietly return to normal position.

Figure 11:
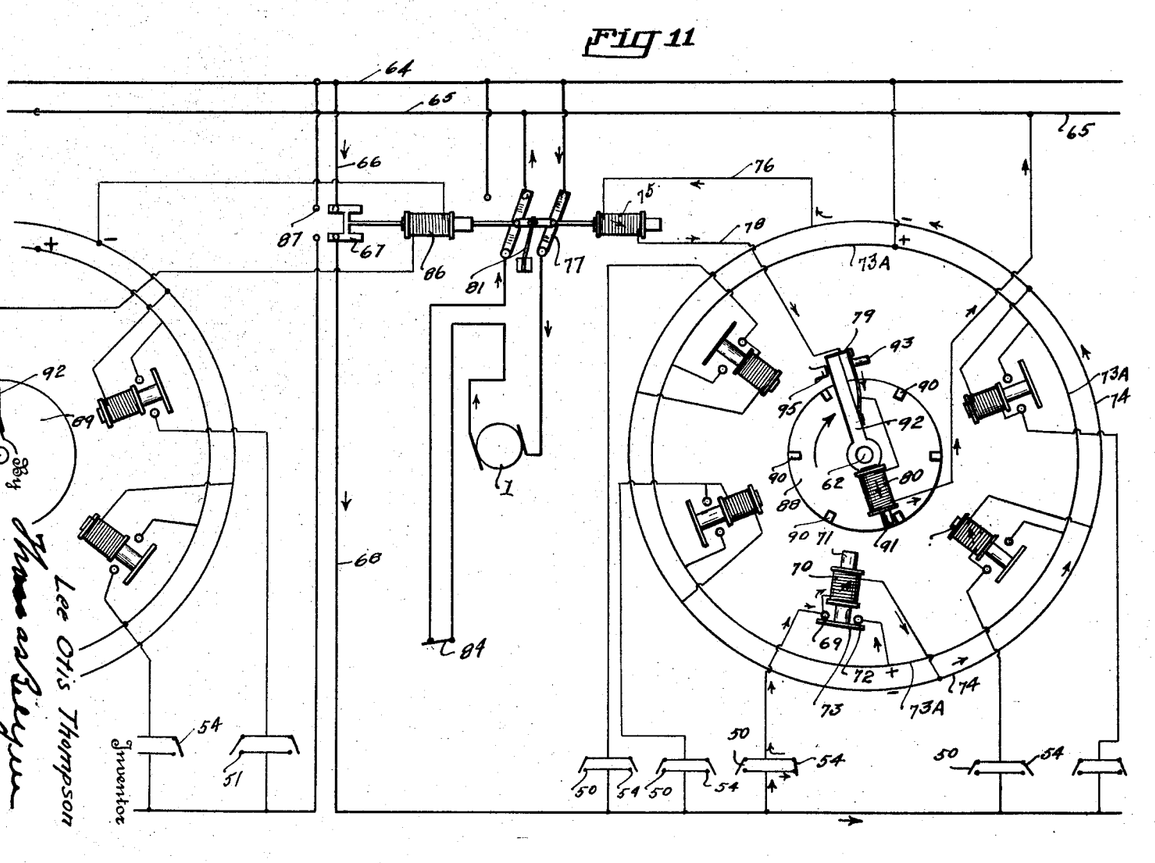
Fig. 11 is a diagrammatical lay-out of the electric control mechanism disposed at the aisle station for selectively positioning any desired seat within the series to an aisle position.

In my new and improved device I have shown a mechanism that is adapted to control the operation of six seats in each row and two rows of seats for each control unit, there being an electric motor to furnish the operating power for each set of two rows of seats. For each set of seats there is a control station disposed at the aisle for the convenience of the ushers as well as for the convenience of the patrons of the theatre. The control station has two operating heads or banks having sets of keys, with each key representing a particular seat location. The control station is preferably disposed upon a standard that is disposed at the aisle location. The standard is represented at 48 in Fig. 1 and the heads at 49 and 50 with a multiple of control buttons disposed upon each head. Since there are six seats disposed in each row and since one seat will always be disposed at the aisle it is necessary to provide but five buttons within each head. The control buttons adapted to actuate the front row of seats are shown at 51 and the buttons adapted to control the rear set of seats are represented at 52. In normal condition the electric motor is dead. If it were desired to move the fourth seat to the aisle position the occupant of that seat will push the button disposed upon the fourth seat 53 from the aisle of the front row, the button being represented at 54. A push rod 96 is disposed and extends downwardly from the arm of each seat and contacts with the push button 54 with which it is in registerable alignment, it being normally held in an elevated position through the action of the spring 97. The depressing of the button 54 by the push rod 96 completes an electric circuit. The depressing of this button closes an electric circuit passing through the electric motor 1 and the same is energized and the motor remains energized until the cycle of operation is completed and the seat 53 has been positioned at the aisle location. During the movement of the seats, seats 55, 56, and 57 will move to the rear row and seats 58, 59, and 60 will be transferred from the rear row to the front row. A speed reducer consisting of a worm on shaft 5 meshing with worm wheel 61 disposed upon the shaft 62 leading to the control box 63 operatively connects the drive shaft 5 with shaft 62. The control box 63 is so located as to be available for adjustment and repair but located out of position so as not to be available for being manipulated by the theatre ushers or the patrons of the theatre. A series of electric controls are disposed in the box with a set of controls for each row of seats and, as here described, there being two sets of controls in each control box. When it is desired to move from seat 53 the button 54 disposed adjacent the arm of this seat is actuated and in the actuation of the same the motor is energized. The operating electric current flows from a source not here shown through the electric wires 64 and 65. The current flows through the conductor 66 switch 67, conductor 68 and through the switch 54, through the contact point 69 and the solenoid 70. The current passing through the solenoid 70 actuates the core 71 to the position shown in full line in Fig. 11. As the switch 54 is only momentarily closed I provide a means for keeping the electric circuit through the solenoid 70 closed by bridging the contact points 69 and 72 with the contact bar 73 mounted upon the core 71. Electric energy will flow through conductor 73A through solenoid 70 to the conductor 74, in the direction indicated by the arrow illustrated in Fig. 11 to the solenoid 75 through the conductor 76. This last solenoid closes the reverse switch 77 as shown in Fig. 11. The control current then flows from solenoid 75 through conductor 78 to switch 79, solenoid 80 and returned to the electric conductor 65. The switch 77 is a reversible switch, and the actuation of the same from the front or back row predetermines the direction of rotation of the electric motor 1. The switch 77 is held in the normal position of an open switch by the spring 81. The spring 81 returns the switch to the normal or open position upon the completion of each cycle of operation. The completion of each cycle of operation permits spring tension to return the solenoid cores to their normal position also. To provide a factor of safety to the controls and to prevent the actuating of other control buttons during the operation of the device, and to further insure the completion of the cycle of operation heretofore set in motion I have provided means adapted to prevent the actuating of any controls during the period of the occupant leaving the seat. When the occupant of the seat rises to leave the seat the platform 83 is depressed by his weight opening thus the switch 84 thereby breaking the motor circuit. The switch 84 is shown in Fig. 12 and consists of a casing having a plunger 84A operating through the top which is engaged by a finger 83A extending downwardly from the platform 83. Within the casing are a pair of contacting members 84B and 84C provided respectively with circuit connectors 84E and 84D. Electric circuit connection is made with these two connectors. The contact member 84C is capable of being moved downwardly away from member 84B to open the circuit, which downward movement is caused by a downward movement of 84A which of course is transmitted by 83A from platform 83. The breaking of the motor circuit through the depressing of the platform 83 prevents the starting of another cycle of operation until the platform 83 is returned to normal position through the action of the compressed spring 85. To further prevent the reversing of the motor when a cycle of operation has been started I provide a switch 67 that normally closes the circuits leading to both control heads for each row of seats.

The actuating of the switch 67 in one direction breaks the control circuit in the other circuit until the cycle of operation has been completed. This is accomplished by the core of the solenoid 86 pulling the switch 67 to the position illustrated in Fig. 11 opening the contacts 87, which in the position described, breaks the circuit leading to and from the rear seat control thus making it inoperative for the cycle of operation.

Figure 9:
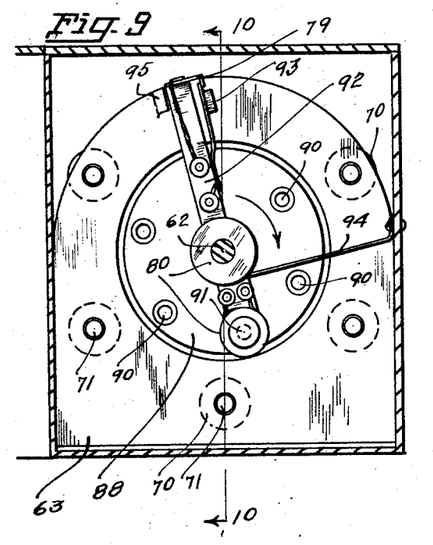
Fig. 9 is an end, sectional view, taken on line 9—9 of Fig. 8, looking in the direction indicated.
Figure 10:
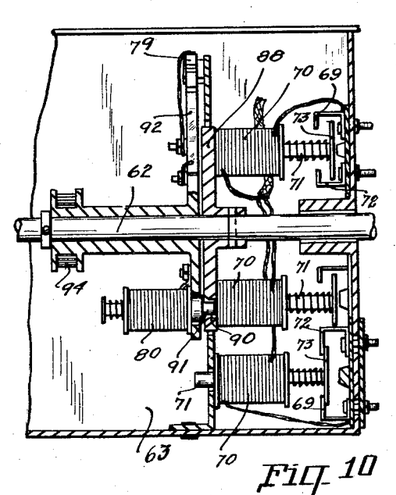
Fig. 10 is a sectional, side elevation, taken on line 10—10 of Fig. 9, looking in the direction indicated.

When the power shaft 5 is set in rotation by the starting of the electric motor 1, the same rotates the shaft 62 within the control box. The shaft 62 has a multiple of discs 88 secured thereto. Each disc has a series of openings 90 disposed therein which are in registerable alignment with the core of the solenoid 80. The entering of the core 91 of the magnet within the opening 90 of the disc 88 will rotate the arm 92 to which the solenoid 80 is secured in the direction of the arrow. Arm 92 carries the switch 79. When the outwardly extending lug 93 disposed upon the switch arm 79, which is in registerable alignment with core 71, contacts therewith, as the same is rotated, this breaks the electric control circuit and the cycle of operation is completed and the spring 94 returns the arm 92 to normal position against the stop 95, as illustrated in Fig. 9.

The cycle of operation heretofore described was a cycle of operation set in motion from a seat position. A cycle of operation may also be set in motion from the aisle standard by the depressing of any one of the buttons disposed in either of the operating heads representing the respective seats, disposed in either row of seats, representing the series of seats of that respective series. When this is done the cycle of operation will be accomplished in a similar manner to that heretofore described.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:

1. In a device of the class described, the combination of an endless guideway, a series of seats having downwardly extending spindles that are adapted to being manipulated along the guideway, in either direction, supporting elements disposed upon the base of each seat, said supporting elements adapted to engage in and follow a predetermined path, driving elements and driven elements adapted to move all of the seats in the series simultaneously and means for moving a part of the seats at a higher rate of speed than the remainder of the seats within the series.

2. In a device of the class described, the combination of an endless guideway, a series of seats comprising two rows of seats, each having a downwardly extending spindle adapted to being moved within the guideway, a sprocket disposed upon the spindle, driven chains adapted to engage the sprocket and to impart lateral movement thereto on a part of its travel along the guideway and a gear segment adapted to engage one side of the sprocket on a part of the circumference of the guideway, and selective means for predetermining the direction of travel of the seats of the series.

3. In a device of the class described, the combination of a supporting platform having grooves disposed therein and an endless guideway extending therethrough, a series of two rows of seats superposed upon the platform each seat having supporting elements adapted to engage the grooves and each seat having a spindle adapted to the guideway and extending therethrough, a driving element disposed upon the spindle, means coacting with the driving element for imparting lateral movement thereto at different rates of speed during the circuit of the guideway and means for imparting movement to all of the seats of the series simultaneously and means for predetermining the stop position of any seat of the series.

4. In a device of the class described, the combination of a seat supporting platform, said platform having pathways disposed on the upper surface thereof, and an endless guideway extending therethrough, a series of two rows of seats arranged in parallel rows superposed the platform and supporting elements disposed between the seats and the platform, and adapted to engage the pathways, a downwardly extending central spindle extending through the guideway, power means adapted to engage the spindle and to move the same, and means for predetermining the stop position of a selected seat.

5. In a device of the class described, the combination of a platform, grooves disposed in the upper surface of the platform and an elliptical guideway disposed therethrough, a series of two rows of seats superposed on the platform and seat supports disposed between the platform and the seats, said seat supports adapted to engage and follow within the grooves disposed within the platform, a spindle depending from the seat and extending through the platform within the guideway, and means for moving the series of seats in either direction relative to the grooves and the guideway.

6. In a device of the class described, the combination of a platform having grooves disposed in the surface thereof and a guideway disposed therethrough, a multiple of seats superposed on the platform and arranged in a series of two rows, means for supporting the individual seats relative to the grooves and to the passageway, means for moving the seats of each row in either direction and means disposed adjacent each seat and at a central position adapted to set in motion a cycle of operation that will position the selected seat to the nearest aisle position.

7. In a device of the class described, the combination of seat supporting elements, a series of seats disposed upon the seat supporting elements, means for imparting lateral movement to the series and a starting station disposed adjacent each seat and a central station adapted to start the movement and means for predetermining the stop position of the seats when movement is imparted thereto.

8. In a device of the class described, the combination of a series of seats arranged in two parallel rows with an equal number of seats in each row, a predetermined path of travel for the seats, means for moving the seats within the path of travel and an individual starting station disposed adjacent each seat and a central starting station and means for predetermining the stop position of each movement started.

9. In a device of the class described, the combination of two rows of seats, supporting elements for the seats, means for imparting horizontal lateral movement to the seats within a predetermined travel path, a starting station disposed at each seat location and a central starting station and means for predetermining the stop position of any selected seat.

10. In a device of the class described, the combination of two rows of seats arranged in series, supporting elements for the seat series, means for imparting movement to the series through the medium of an electric prime mover, means for predetermining the path to be traveled of each seat in the series, an electric starting station disposed adjacent each seat of the series and an electric starting station disposed at an aisle position with selective means disposed at the station for predetermining the stopping position of the seat indicated.

11. In a device of the class described, the combination of two rows of seats arranged in series, supporting elements for each seat of the series, means disposed upon the supporting elements for determining the path of travel of the seats when moved relative to the supporting element, an electric motor adapted to move the series of seats simultaneously, a starting station for starting the electric motor disposed adjacent each seat of the series and an electric starting station disposed at each station for predetermining the stop position of the seat indicated to be stopped at a predetermined stop location.

12. In a device of the class described, the combination of a series of two rows of seats arranged in an endless series, electric power means for moving the series of seats simultaneously in either direction and a like number of seats from either row to the other, means disposed at each seat and at a central station adapted to start the motor and to move the seats of the series within a predetermined path of travel and to stop the movement at a predetermined stop location.

LEE OTIS THOMPSON.